July 21, 1959     A. J. MAZZIO ET AL     2,895,416
FEED MECHANISM AND INTERRUPTER FOR DUPLICATING MACHINES
Filed May 10, 1954     11 Sheets-Sheet 1
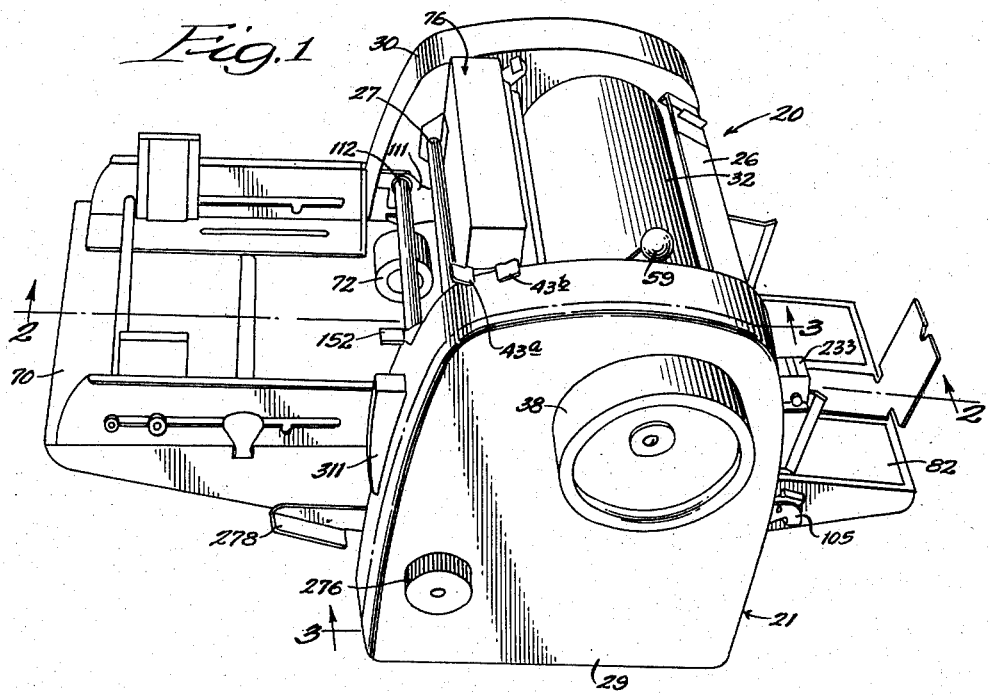
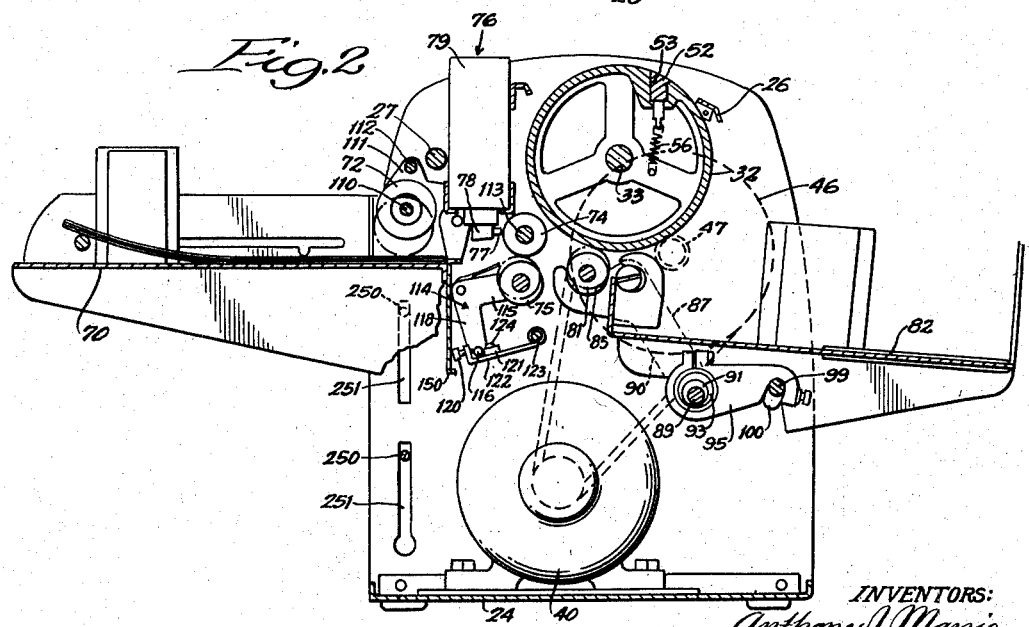
INVENTORS:
Anthony J. Mazzio,
George P. Niesen,
George E. Engelstad and
BY Edgar H. Du Bois,
Otmo, M<sup>c</sup>Dougall, Williams & Hersh.
ATTORNEYS.

July 21, 1959

A. J. MAZZIO ET AL 2,895,416

FEED MECHANISM AND INTERRUPTER FOR DUPLICATING MACHINES

Filed May 10, 1954

INVENTORS:
Anthony J. Mazzio,
George P. Niesen,
George E. Engelstad and
Edgar H. DuBois,
BY
Orms, McDougall, Williams & Hersh,
ATTORNEYS.

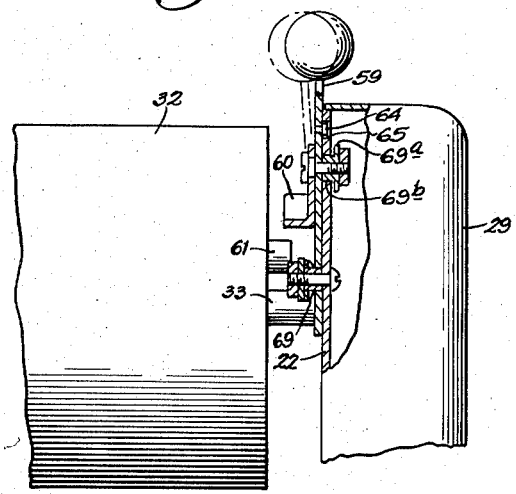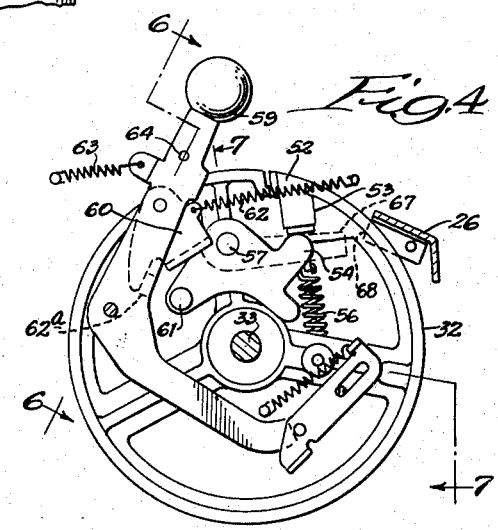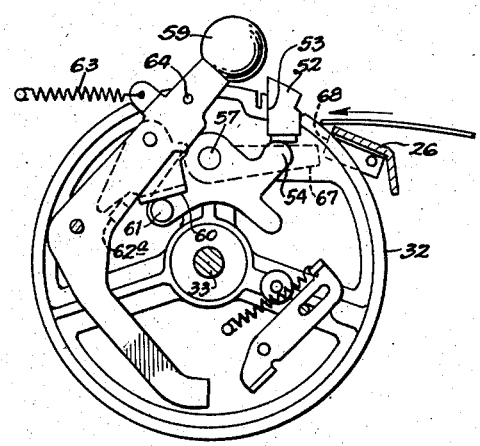

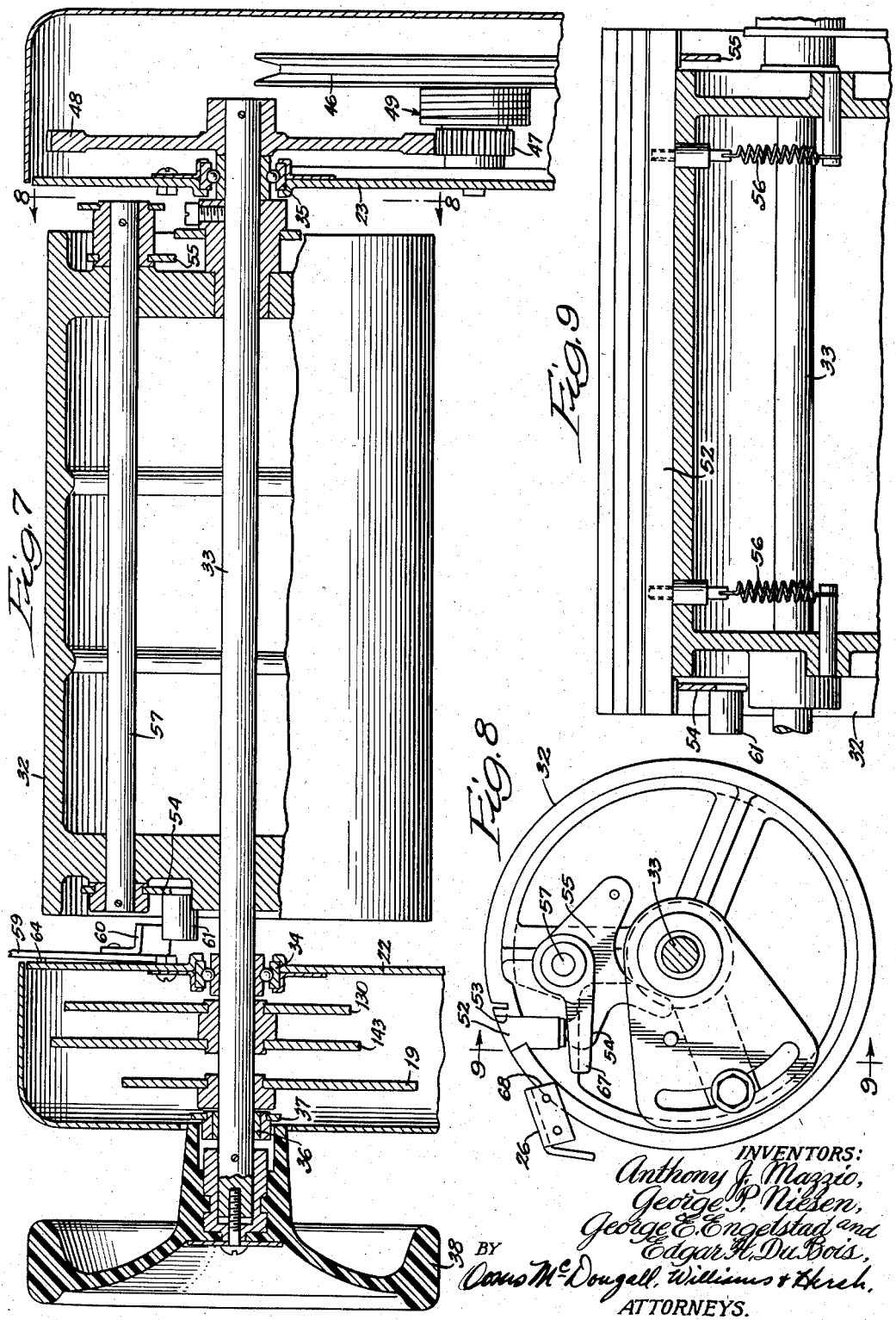

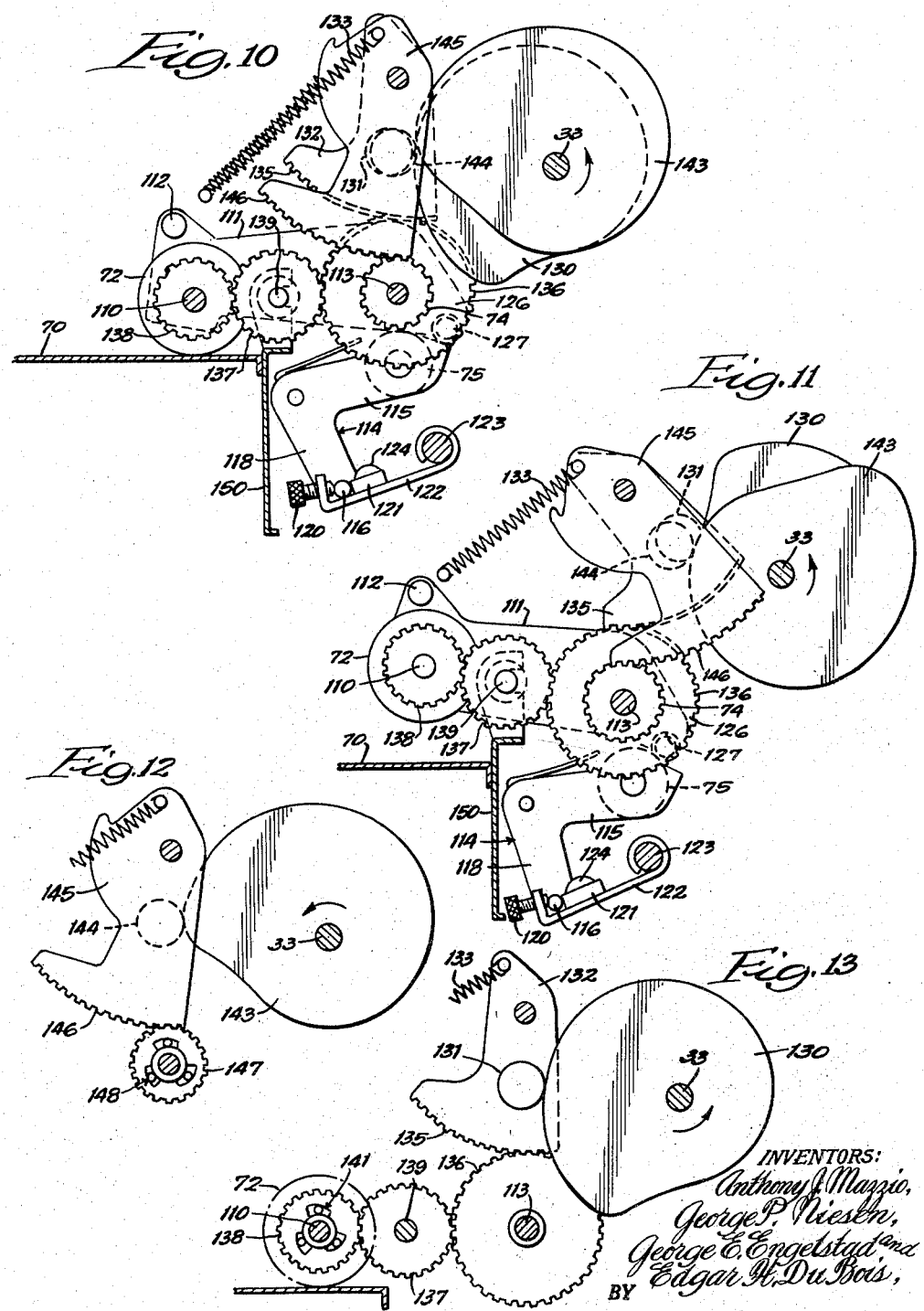

July 21, 1959 A. J. MAZZIO ET AL 2,895,416
FEED MECHANISM AND INTERRUPTER FOR DUPLICATING MACHINES
Filed May 10, 1954 11 Sheets-Sheet 6

INVENTORS:
Anthony J. Mazzio,
George P. Niesen,
George E. Engelstad
and Edgar H. DuBois,
BY
Osma McDougall, Williams & Hersh,
ATTORNEYS.

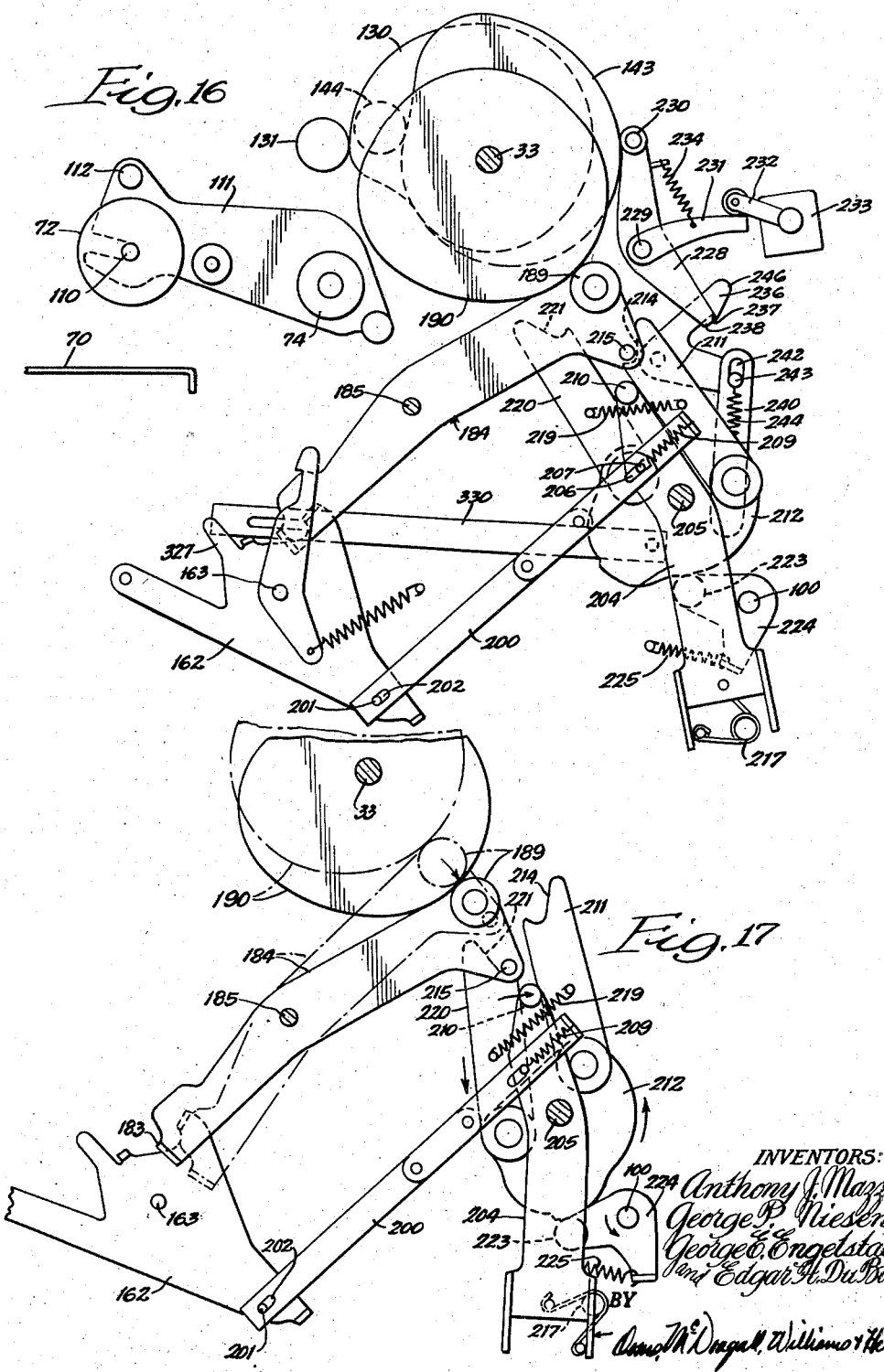

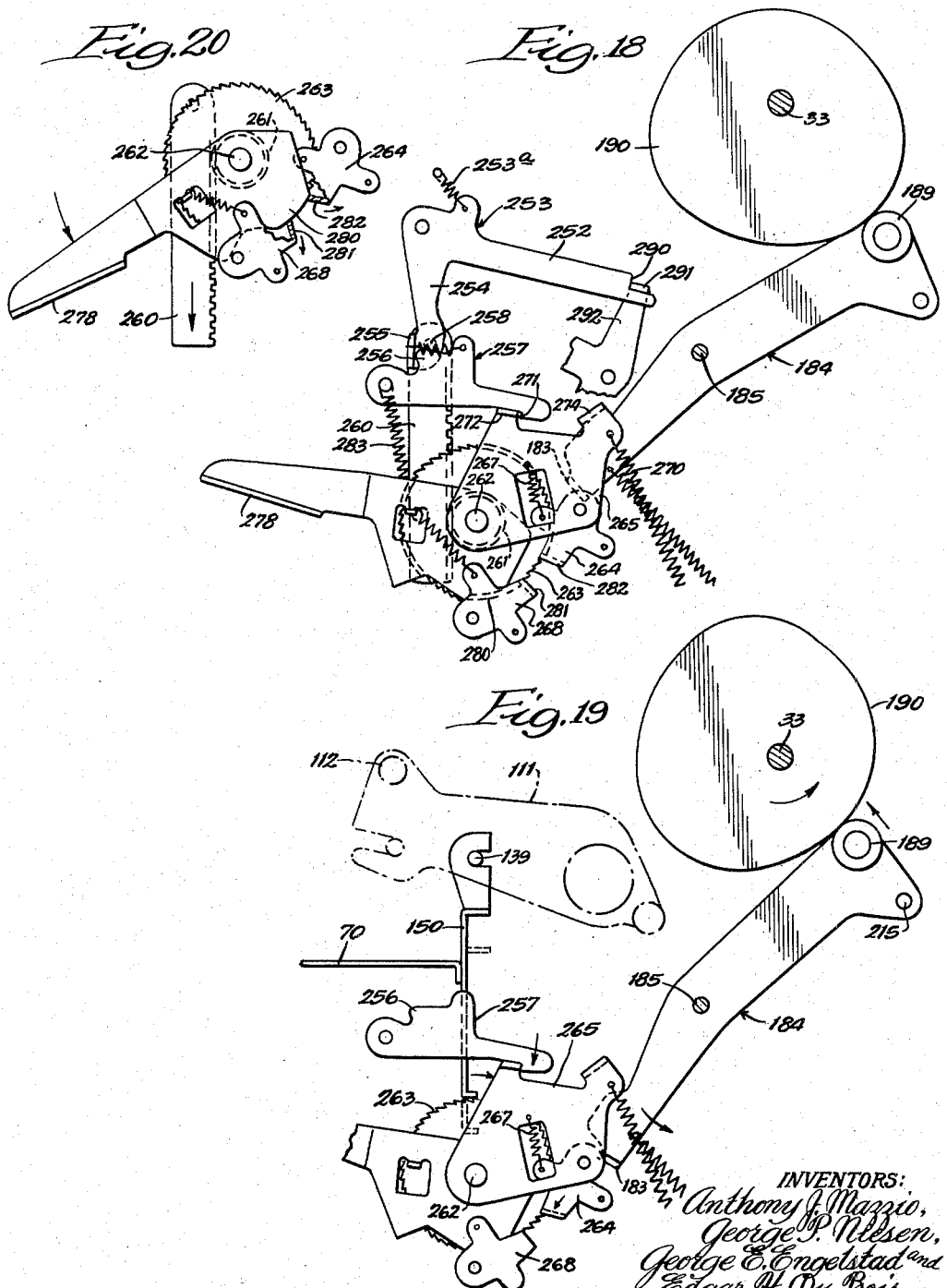

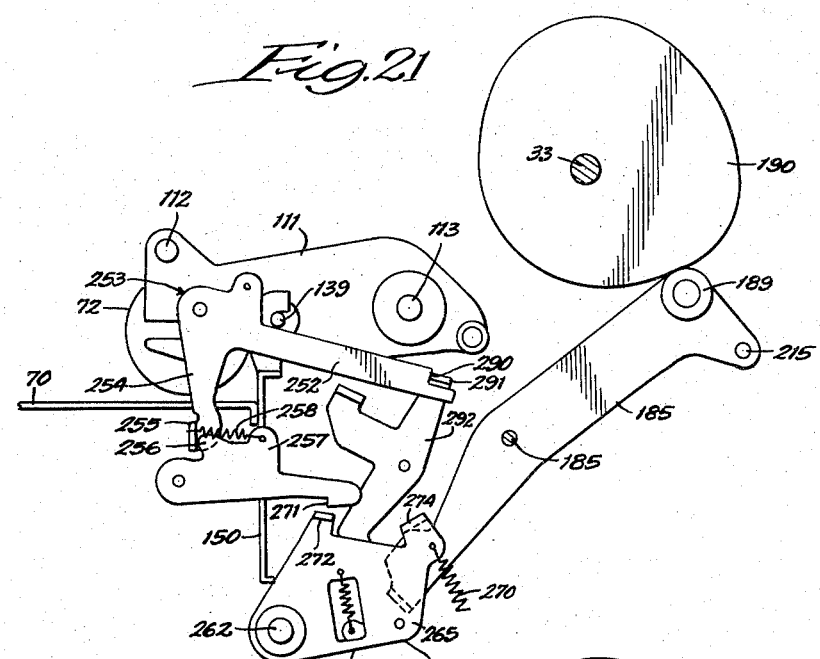
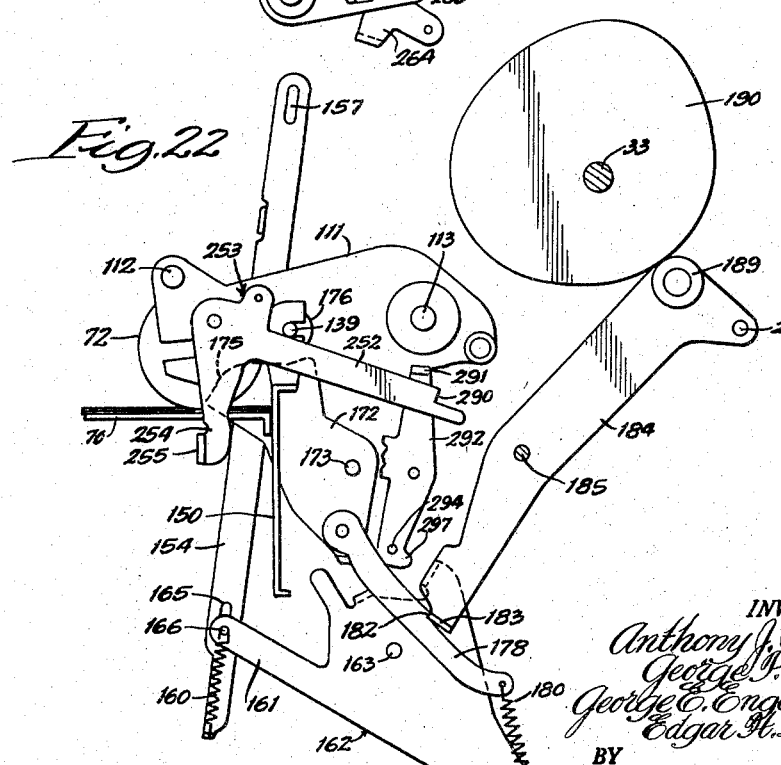

July 21, 1959  A. J. MAZZIO ET AL  2,895,416
FEED MECHANISM AND INTERRUPTER FOR DUPLICATING MACHINES
Filed May 10, 1954  11 Sheets-Sheet 10
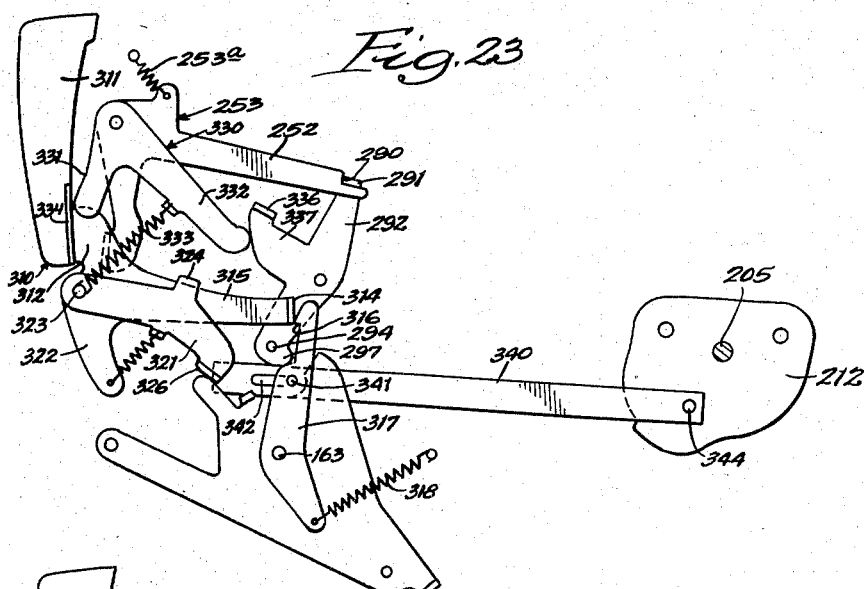
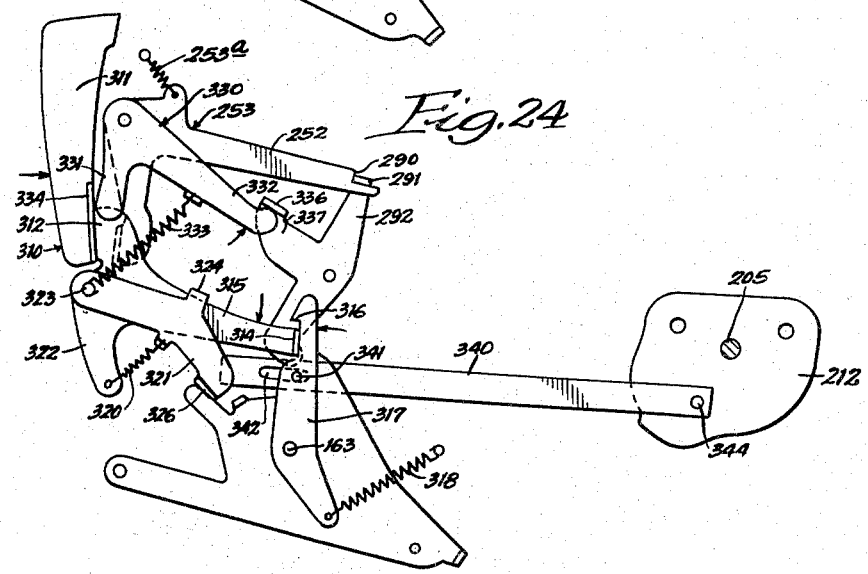
INVENTORS:
Anthony J. Mazzio,
George P. Nielsen,
George E. Engelstad and
Edgar R. Du Bois,
BY
Cross, McDougall, Williams & Hersh,
ATTORNEYS.

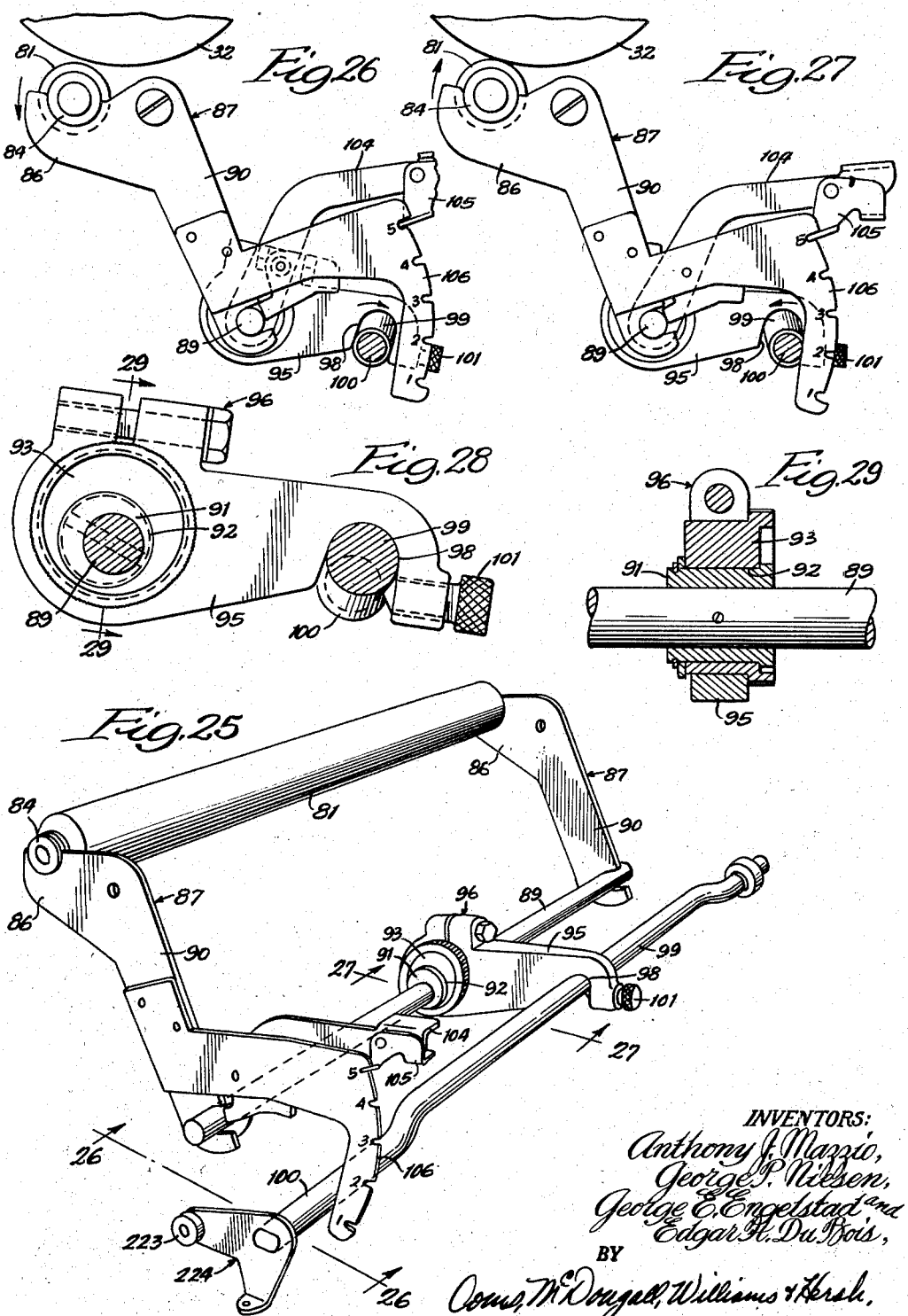

United States Patent Office 2,895,416
Patented July 21, 1959

2,895,416

FEED MECHANISM AND INTERRUPTER FOR DUPLICATING MACHINES

Anthony J. Mazzio, Chicago, George P. Niesen, Niles, and George E. Engelstad and Edgar H. Du Bois, Chicago, Ill., assignors to A. B. Dick Company, a corporation of Illinois Application May 10, 1954, Serial No. 428,422

6 Claims. (Cl. 101—245)

This invention relates to duplicating machines and particularly to a new and improved feed mechanism for duplicating machines of the type utilizing the liquid process, whereby copy sheets, moistened with a suitable liquid, are pressed against a reverse printed master so that the image on the master will be transferred to the copy sheets.

An object of the invention is to provide a feed mechanism having improved control means for turning the feed on and off.

A further object is to provide a power operated duplicator having improved control means for turning the copy sheet feeding mechanism off when the supply of copy sheets is nearly or totally exhausted.

Another object is to provide an improved feed mechanism having control means operable to feed a single copy sheet.

A further object is to provide a power operated feed mechanism having control means operable to turn the feed mechanism on for one duplicating cycle only, so as to feed a single sheet.

It is another object to provide a feed mechanism having improved means for turning the mechanism off automatically when the supply of copy sheets is nearly or totally exhausted.

A further object is to provide a feed mechanism having control means operable to feed a single copy sheet, whether or not the feed mechanism has been shut off by means responsive to near exhaustion of the supply of copy sheets.

Another object is to provide a feed mechanism having a recorder and improved means for preventing operation of the recorder when the feed is off.

Further objects and advantages of the invention will appear from the following description of an illustrative embodiment thereof, taken with the accompanying drawings, in which:

Figure 1 is a general perspective view of an exemplary liquid process duplicating machine having a feed mechanism constructed in accordance with the invention;

Fig. 2 is an elevational sectional view of the machine, taken generally along a line 2—2 in Fig. 1;

Fig. 4 is a fragmentary elevational sectional view showing the right hand end of the cylinder of the machine and certain details of the master clamp which holds the master sheet on the cylinder, the clamp being shown in closed position;

Fig. 5 is a view similar to Fig. 4, showing the master clamp open;

Fig. 6 is a fragmentary sectional view taken generally along a line 6—6 in Fig. 4;

Fig. 7 is an elevational sectional view taken through the cylinder, generally along a line 7—7 in Fig. 4;

Fig. 8 is a sectional view taken generally along a line 8—8 in Fig. 7;

Fig. 9 is another sectional view taken through the cylinder, generally along a line 9—9 in Fig. 8;

Fig. 10 is a fragmentary, somewhat diagrammatic, sectional view showing power actuated means for operating the feed mechanism, the latter being shown with the feed turned on;

Fig. 11 is a view similar to Fig. 10 showing the mechanism with the feed turned off;

Fig. 12 is a fragmentary view showing details of the means for driving the combination moistening and forwarding rollers of the machine;

Fig. 13 is a fragmentary view showing details of the means for driving the paper separating feed roller of the machine;

Fig. 16 is a fragmentary diagrammatic elevational view showing means whereby the impression roller is thrown on and off the master cylinder when the feed is turned on and off, the illustrated parts being shown in the positions they occupy when the feed is turned off;

Fig. 17 is a view similar to Fig. 16 showing the mechanism with the feed turned on;

Fig. 18 is a fragmentary elevational view showing means for automatically raising the copy sheet supply table of the machine to maintain the top of the supply stack at a substantially constant elevation;

Fig. 19 is a view similar to Fig. 18 with certain parts in changed positions;

Fig. 20 is a fragmentary view similar to Fig. 18 showing manually operable means for lowering the supply table;

Fig. 21 is another view similar to Fig. 18 showing further changed positions of the illustrated parts;

Fig. 22 is a diagrammatic view showing means for automatically shutting off the feed mechanism when the supply of copy sheets is nearly exhausted;

Fig. 23 is a fragmentary, diagrammatic elevational view showing means for feeding a single copy sheet;

Fig. 24 is a view similar to Fig. 23 showing certain components in changed positions;

Fig. 25 is a perspective view of a mechanism employed in the duplicating machine for adjusting and shifting the impression roller;

Fig. 26 is an elevational sectional view taken generally along a line 26—26 in Fig. 25, the impression roller being shown retracted from the master cylinder:

Fig. 27 is a view similar to Fig. 26 with the impression roller advanced into engagement with the cylinder;

Fig. 28 is an enlarged sectional view taken generally along a line 28—28 in Fig. 25; and Fig. 29 is a fragmentary sectional view taken generally along a line 29—29 in Fig. 28.

Figure 3:
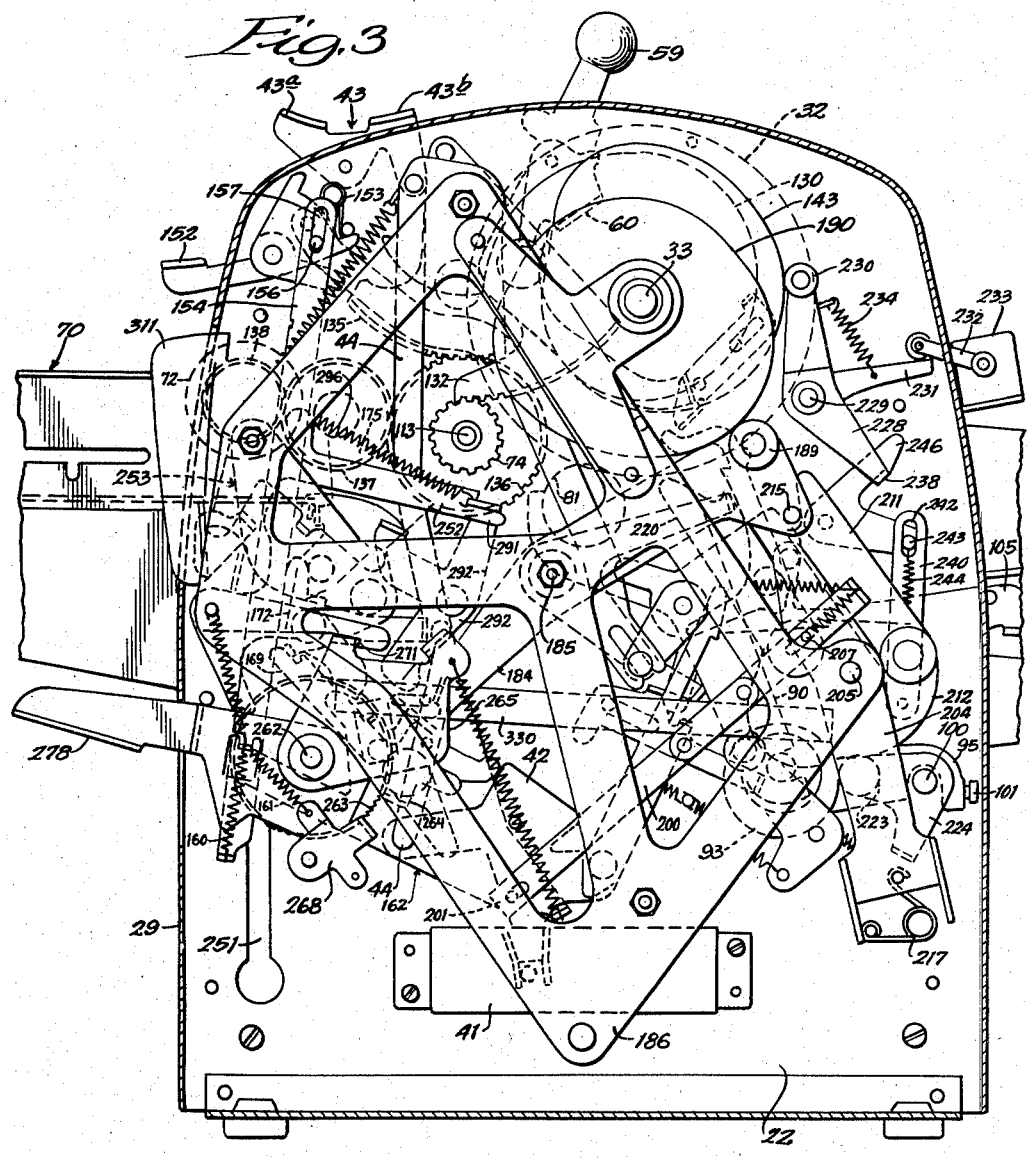
Fig. 3 is an enlarged fragmentary elevational sectional view, taken generally along a line 3—3 in Fig. 1, and showing certain details of a mechanism for controlling the various functions of the machine.

While a preferred embodiment of the invention is disclosed in this application, it will be understood that there is no intention to limit the invention to the details of such embodiment. Rather, it is the intention to cover all modifications, alternative constructions and equivalents embraced within the spirit and scope of the appended claims.

The preferred form of the invention, shown in the drawings to illustrate but not to limit the invention, is embodied in a power operated liquid process duplicator 20 (Figs. 1, 2, and 8) having a frame 21 comprising a pair of vertical side plates 22 and 23 mounted on a base plate 24. A tie bar 26 and one or more tie rods 27 extend between the side plates 22 and 23. Right and left cover pans 29 and 30 are mounted on the side plates 22 and 23.

To hold a master sheet which bears a reverse image printed in a suitable transferable ink, the machine includes a master cylinder 32 adjustably secured to a shaft 33 which is journaled in bearings 34 and 35 mounted on the side plates 22 and 23. An additional bearing 36, mounted on an outboard bracket 37, supports the outboard right hand end of the shaft 33, which carries a hand wheel 38.

The cylinder 32 is driven by an electric motor 40. Electrical energization of the motor 40 is controlled by a switch 41 (Fig. 3) which is operable by a lever 42 connected to a hand lever 43 by means of a link 44. Finger pieces 43a and 43b are provided on the lever 43 for turning the motor on and off. The motor 40 is belted to a pulley 46 (Fig. 8) which drives a pinion 47 meshing with a gear 48 secured to the cylinder shaft 33. In order that the motor 40 may start without load, an automatically engaging clutch 49 may be connected between the pulley 46 and pinion 47. Although the clutch may be constructed in any known manner so as to engage when the motor 40 comes up to speed, a particularly advantageous construction is disclosed and claimed in a copending application Serial No. 444,758, filed July 21, 1954, now U.S. Patent No. 2,789,674.

The master sheet may be secured to the cylinder 32 by a suitable clamp (Figs. 4, 5, 7, and 8) illustrated as comprising a clamping bar 52 movable outwardly and inwardly in a longitudinal slot 53 formed in the cylinder. A pair of levers 54 and 55 are arranged to slide the bar 52 outwardly against the bias of springs 56, the levers being fixed to a rockshaft 57. A hand lever 59 is pivoted on the rigeht hand side plate 22 and is provided with a spring biased pawl 60 for engaging a roller 61 on the right hand clamp lever 54. A spring 62 is arranged to bias the cam 60 against a stop 62a projecting laterally from the lever 59. When it is desired to insert or remove a master sheet, the clamp may be opened by swinging the hand lever 59 clockwise, against the bias of a spring 63, to the position shown in Fig. 5, whereupon a laterally projecting detent member 64 on the hand lever will snap into an aperture 65 formed in the side plate 22 so as to lock the hand lever. The cylinder 32 is then rotated clockwise, which is the reverse of its normal direction of operation, so as to move the roller 61 against the pawl 60, whereupon the levers 54 and 55 swing counterclockwise to move the clamp bar 52 outwardly into its open position. The clockwise rotation of the cylinder 32 is limited by the engagement of an arm 67 with a stop 68 at the left hand end of the tie bar 26. The stop arm 67 is secured to the left hand end of the rockshaft 57 so that it swings outwardly when the clamp is opened. The lever 59 may be released by moving it laterally to withdraw the detent projection 64 from the aperture 65. Such lateral movement is resisted by a spring disk 69 and is limited by a flanged member 69a which is mounted on the lever 59 for movement along a slot 69b formed in the side plate 22.

To hold a stack of copy sheets, the duplicator 20 is equipped with a suitable feed table 70 (Figs. 1 and 2). Provision may be made for automatically raising the table 70 in a manner to be described shortly, so as to maintain the top of the supply stack at a substantially constant level as the copy sheets are used.

The copy sheets are separated from the top of the stack and fed into the machine by means of a power driven feed roller 72 which may be raised and lowered, in a manner to be described shortly, so as to turn the feed off and on. Each copy sheet is advanced by the feed roller 72 between a pair of combination moistening and forwarding rollers 74 and 75. A film of the liquid used in the transfer process is applied to the upper roller 74 by means of a moistener 76 comprising a wick 77 having its upper edge in engagement with the roller 74. The lower portion of the wick 77 extends into a trough 78. A supply of the liquid is maintained at a constant level in the trough by means of a tank 79 mounted in an inverted position with its mouth immersed in the liquid in the trough. The moistener 76 is disclosed and claimed in a copending application, Secial No. 438,829, filed June 23, 1954, now abandoned.

The rollers 74 and 75 are power driven, in a manner to be described below, so as to forward the moistened copy sheet to the master cylinder 32. The copy sheet is pressed against the master sheet on the cylinder 32 by means of an impression roller 81, so that a portion of the image on the master sheet will be leached out by the liquid and transferred to the copy sheet. After passing between the cylinder 32 and the impression roller 81, the copy sheet is deposited in a suitable receiving tray 82.

The drawings illustrate certain details of a mechanism for ejecting the master sheet from the cylinder 32, discontinuing the feed, moving the impression roller away from the cylinder, and turning off the motor 40 when the clamp lever 59 is swung clockwise while the machine is operating. However, this mechanism is claimed in a copending application, Serial No. 428,421, filed May 10, 1954, now U.S. Patent No. 2,821,910.

The impression roller 81 is mounted so that it may be moved into and out of engagement with the master cylinder 32. Moreover, the mounting is such that the pressure between the roller 81 and the cylinder may be regulated.

To attain these objectives, the impression roller 81 is journaled in bearing blocks 84 (Figs. 25–29) which are removably mounted on horizontal arms 86 of bell crank levers 87. A spring bar 89 extends between downwardly extending arms 90 on the levers 87. To adjust the pressure on the impression roller, an eccentric 91 is secured to the spring bar 89 at or near its center point. The eccentric 91 is rotatable in an eccentric opening 92 formed in an adjusting disk 93, which is adjustably rotatable in one end of an arm 95. A clamp 96 is provided to lock the disk 93 in its adjusted position. The other end of the arm 95 is formed with a generally semi-circular notch 98 adapted to receive a crank 99 formed integrally with a crankshaft 100, the crank 99 being retained in the notch by a thumbscrew 101 mounted on the arm. The crankshaft 100 may be rotated, by means to be described shortly, in order to move the impression roller 81 into and out of engagement with the cylinder 32.

In order to adjust the eccentric 91 the spring bar 89 may be rotated by means of an arm 104 fixed thereto. A pawl 105 is pivoted on the arm 104 for spring pressed engagement with a notched detent bracket 106 mounted on the right hand bell crank lever 87. The arm 104 may readily be adjusted by the operator of the machine, but the eccentric disk 93 is ordinarily adjusted only at the factory or by a serviceman. Thus, the disk 93 may be set to provide a proper range of adjustment for the arm 104.

Returning to the feed mechanism, the feed roller 72 is mounted on a shaft 110 extending between the outer ends of arms 111 which are swingable about the axis of a shaft 113. The upper forwarding and moistening roller 74 is rotatably supported by the shaft 113. A tie rod 112 rigidly interconnects the arms 111.

The lower forwarding roller 75 is provided with an adjustable spring mounting (Fig. 11), comprising a pair of bell crank levers 114 having upper, generally horizontal arms 115 on which the roller 75 is removably mounted, the levers being pivoted on the side plates 22 and 23. A spring rod 116 extends between downwardly extending arms 118 on the levers 114. The center of the rod 116 is normally held between a thumbscrew 120 and an eccentric disk 121 mounted on an arm 122 which is swingably supported on a tie rod 123 extending between the side plates 22 and 23. When the thumbscrew 120 is loosened the roller 75 may be swung downwardly for easy removal. The eccentric disk 121 is secured to the arm 122 by means of a clamping screw 124 which may be loosened to permit rotary adjustment of the eccentric. With the thumbscrew 120 tightened, the rod 116 is normally bowed so that spring pressure is applied to the roller 75. The amount of bowing may be varied by adjusting the eccentric disk 121. This adjustment need not be disturbed when the roller 75 is removed or replaced.

To separate the forwarding rollers 74 and 75 when the feed roller 72 is raised, the forwardly extending supporting arms 111 are formed with short rearwardly extending lever arms 126 (Fig. 11). Rollers 127 are mounted on the arms 126 for camming engagement with the bell crank levers 114, adjacent their outer ends. Thus the roller 75 is cammed downwardly against the bias of the bow spring 116, when the feed roller 72 is raised.

The feed roller 72 and the forwarding rollers 74 and 75 may be driven by any known or desired means adapted to effect intermittent rotation in timed relation to the rotation of the master cylinder 32. In the illustrated machines, the drive for the feed roller 72 comprises a cam 130 (Figs 10–13) secured to the right hand end of the cylinder shaft 33. The cam 130 is engaged by a roller 131 on a follower lever 132 which is biased by a spring 133 so that the roller 131 will follow the cam. Formed on the follower lever 132 is a gear sector 135 meshing with a gear 136 which is freely rotatable about an axis coinciding with that of the upper forwarding roller shaft 113. The gear 136 meshes with an idler gear 137 which in turn engages gear 138 carried by the feed roller shaft 110, the idler 137 being supported on a shaft or pin 139 mounted on one of the roller supporting arms 111. A one-way freewheeling clutch 141 is provided to connect the gear 138 to the feed roller 72, so that the roller 72 will be driven counterclockwise but not clockwise, the roller also being free to overrun its drive. On the rise of the cam 130, the feed roller 72 is rotated counterclockwise and the topmost copy sheet in the stack is thus advanced into the crotch between the forwarding rollers 74 and 75. The one-way clutch 141 prevents the roller 72 from being driven clockwise on the fall of the cam 130.

Similarly, the drive for the forwarding rollers 74 and 75 comprises a cam 143 engaged by a roller 144 on a follower lever 145. A gear segment 146 on the lever 145 meshes with a gear 147 which is connected to the upper forwarding roller by means of a one-way freewheeling clutch 148. When the copy sheet is being advanced into the crotch of the rollers 74 and 75, the follower 145 is at a dwell point on the cam 143 so that the rollers are stationary. On the subsequent rise of the cam 143, the roller 74 is driven counterclockwise and the copy sheet is forwarded between the rollers to the crotch of the cylinder 32 and the impression roller 81. On the fall of the cam 143, the one-way clutch 148 prevents the gear 147 from driving the roller 74 clockwise.

To facilitate the positioning of the stack on the feed table 70, a vertically movable stop plate 150 is connected to the arms 111 which support the feed roller 72. When the feed is turned off by raising the feed roller 72, the plate 150 is moved upwardly to serve as a stop against which the leading end of the stack may be positioned. Lowering the feed roller 72 drops the plate below the top of the stack so that the plate does not affect the normal feeding of the copy sheets.

The operation of the feed mechanism is controlled by a hand lever 152 (Figs. 14 and 15) which may be swung up and down to turn the feed on and off. An over center spring 153 is effective to hold the lever 152 in either position. The lever 152 is connected to a downwardly extending link 154 by means of a lost motion connection comprising a pin 156, mounted on the lever, and a slot 157 in the link to receive the pin. A spring 158 is connected between the pin 156 and the link to bias the link upwardly When the feed lever 152 is raised to turn on the feed, the pin 156 pushes the link 154 downwardly. This ordinarily has the effect of tensioning a spring 160 connected between the lower end of the link 154 and an arm 161 on a many armed control lever or plate 162 mounted on a pivot 163. The link 154 is formed with a slot 165 for receiving a pin 166, mounted on the arm 161, to form a lost motion connection between the link 154 and the lever 162.

The tensioning of the spring 160 tends to swing the control lever 162 counterclockwise, but the lever does not immediately swing fully in this direction, unless the hand lever 152 happens to be raised during a predetermined portion of the duplicating cycle. At other points in the duplicating cycle, counterclockwise rotation of the control lever 162 is restrained by engagement between a laterally extending ear 168 on the lever 162 and a latching arm 169 mounted on the pivot 163. A notch 170, formed in the outer end of the latching arm 169, is normally hooked onto a laterally extending ear 171 on a cam lever or plate 172 mounted on a pivot 173. One edge of the lever 172 is formed into a cam 175 which engages a follower roller 176 mounted on the idler gear shaft 139 carried by one of the feed roller supporting arms 111. It will thus be evident that the cam lever 172 is operable to raise and lower the feed roller 72. However, when the feed is off, the cam lever 172 is latched against movement by the engagement between the ear 171 and the notch 170 in the latching arm 169. In this latched position of the cam lever 172, the roller 176 is on the high part of the cam 175 and the feed roller 72 accordingly is raised out of contact with the paper stack.

The cam lever 172 is actuated by a pawl 178 connected to the lower end of the cam lever by a pivot 179. A spring 180 is connected between the lower end of the pawl and the lower end of the control lever 162, to bias the cam lever 172 counterclockwise. To provide for power actuation of the cam lever 172, the upper edge of the pawl 178 is formed with an undercut latching shoulder 182 adapted to be engaged by a laterally extending ear 183 on the lower end of a follower lever 184 mounted on a pivot 185 extending between the side plate 22 and an outboard mounting plate 186. A spring 188 biases the lever 184 counterclockwise so that a roller 189 on the lever will follow a cam 190 mounted on the master cylinder shaft 33.

Figure 14:
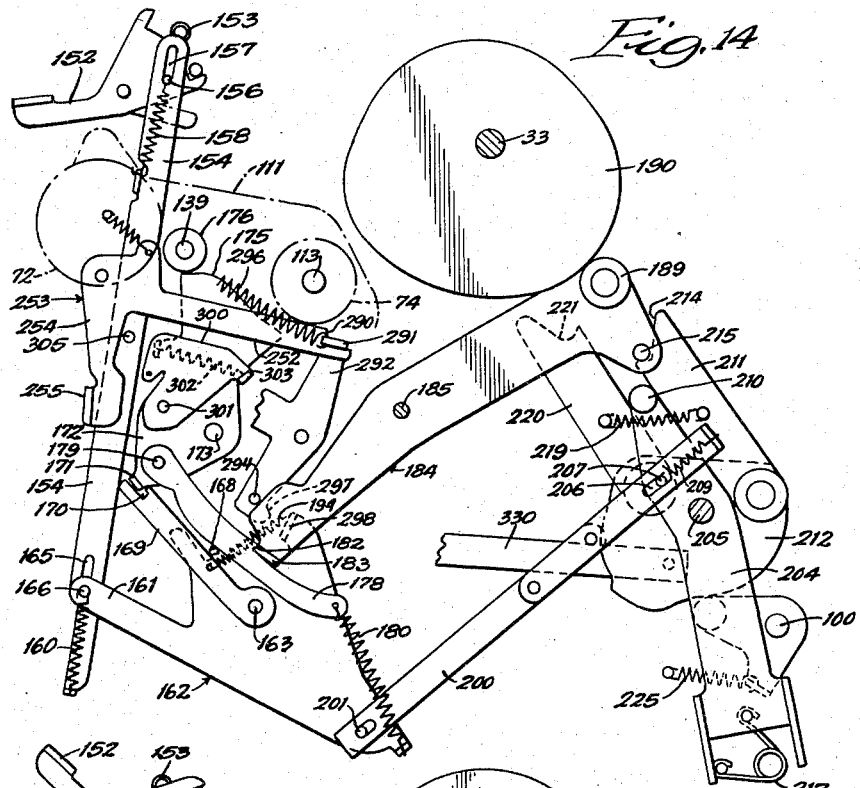
Fig. 14 is a fragmentary, diagrammatic elevational view of means whereby the feed mechanism may be turned on and off, the mechanism being shown in its off position.

As the master cylinder rotates, the lever 184 oscillates continuously. As the high point of the cam 190 approaches the roller 189, the ear 183 on the lever 184 engages the shoulder 182 and pushes the pawl 178 upwardly so as to swing the cam lever 172 clockwise a sufficient amount to disengage the ear 171 from the notch 170, as shown in Fig. 14. With the latching arm thus released, the control lever 162 is free to be swung counterclockwise by the spring 160. The ear 168 on the lever 162 swings the latching arm 169 counterclockwise, out of the path of the ear 171 on the cam lever 172. On the fall of the cam 190 the pawl 178 moves downwardly with the lower end of the follower lever 184, and the cam lever 172 is thus swung counterclockwise to lower the feed roller 72. Near the low point on the cam 190 the pressure between the ear 183 on the follower lever and the shoulder 182 on the pawl is relieved, whereupon the spring 180 swings the pawl 178 downwardly out of the path of the ear 183. During subsequent duplicating cycles the ear 183 swings alongside the pawl 178 without engaging the shoulder 182.

The feed is turned off by swinging the feed lever 152 counterclockwise. This movement tensions the spring 158 and tends to raise the link 154. However, the link 154 is not immediately raised to the fullest possible extent unless the lever 152 happens to be moved downwardly at the low point of the cam 190. If the lever 152 is shifted during other portions of the cycle, the link 154 exerts an upward pull on the arm 161 and swings the control lever 162 clockwise until the ear 168 engages the lower edge of the pawl 178 so as to urge the pawl against the ear 183 on the follower lever 184. At the low point on the cam 190, the ear 183 moves below the shoulder 182 on the pawl 178, whereupon the control lever 162 swings fully clockwise. By means of a biasing spring 194 connected between the latching arm 169 and the lever 162, the latching arm is swung upwardly so that its upper edge engages the ear 171. On the rise of the cam 190, the lever 184 pushes the pawl 178 upwardly and thus swings the cam lever 172 clockwise to raise the feed roller 72. The spring 194 swings the latching arm 169 so as to move the latching notch 170 into the path of the ear 171. Accordingly, on the return stroke of the follower lever 184 the latching engagement between the ear 171 and the notch 170 is restored.

Raising the feed lever 152 is effective not only to lower the feed roller 72 and thus turn on the feed, but also to shift the impression roller 81 into engagement with the master cylinder 32. To control the impression roller 81 a link 200 (Figs. 14-17) is connected to the lower end of the control lever 162 by means of a lost motion connection comprising a pin 201 mounted on the lever 162 and received in a longitudinal slot 202 formed in the lower end of the link 200. The upper end of the link 200 is connected to the upper arm of a snap lever 204 mounted on a pivot 205. The connection between the link 200 and the lever 204 comprises a lost motion slot 206 formed in the link 200 for receiving a pin 207 mounted on the snap lever 204.

It will be recalled that raising the feed lever 152 causes counterclockwise movement of the control lever 162 at the high point of the cam 190. Such movement of the control lever 162 causes upward movement of the link 200. This tensions a spring 209 connected between the upper end of the link 200 and the pin 207, with the result that the snap lever 204 tends to be swung clockwise. However, the snap lever is momentarily restrained by engagement of a pin 210 on its upper end with a pawl 211 which is pivotally mounted at its lower end on a swingable cam plate 212. The cam plate 212 is rotatably mounted on the pivot 205. At its upper end, the pawl 211 is formed with a notch 214 adapted to receive a pin 215 mounted on the follower lever 184. At the high point on the cam 190 the pin 215 is positioned in the notch 214 and thus prevents immediate shifting of the pawl 211. However, on the fall of the cam, the pin 215 retreats upwardly and releases the pawl 211, whereupon the spring 209 snaps the lever 204 fully clockwise, to the position shown in Fig. 17. An over center spring 217 is provided to hold the snap lever 204 in either of its two positions.

The clockwise movement of the snap lever 204 swings the pawl 211 clockwise and tensions a spring 219 connected between the pawl 211 and a second pawl 220 also pivotally mounted on the cam plate 212. The spring 219 swings the pawl 220 clockwise against the pin 215. At the low point of the cam, the spring 219 swings the pawl 220 to its fully clockwise position, as shown in Fig. 17. A notch 221 at the end of the pawl 220 is thus moved into the path of the pin 215. On the rising part of the cam, the pin 215 pushes the pawl 220 downwardly and thus swings the cam plate 212 counterclockwise to the position shown in Fig. 17. The cam plate 212 is engaged by a roller 223 mounted on a lever 224 which is secured to the right hand end of the crankshaft 100 controlling the impression roller 81. The cam plate 212 is shaped so that the counterclockwise movement of the plate results in the lever 224 being swung counterclockwise against the bias of a spring 225. The resulting movement of the crank 99 shifts the bow spring 89 to the left, and thus swings the levers 87 clockwise to raise the impression roller 81 into engagement with the master cylinder 32.

When the feed is turned off by lowering the hand lever 152, the impression roller 81 is withdrawn from the cylinder 32. It will be recalled that this downward movement of the hand lever 152 results in clockwise movement of the control lever 162 somewhat prior to the low point of the cam 190. When thus moved, the control lever 162 pulls the link 200 downwardly and thus shifts the snap lever 204 and the pawls 211 and 220 counterclockwise. The notch 214 in the pawl 211 is thus moved into the path of the pin 215 on the follower lever 184. On the rising part of the cam the pin 215 shoves the pawl 211 downwardly and thus rotates the cam plate 212 clockwise, permitting the spring 225 to swing the lever 224 clockwise and lower the impression roller 81.

Provision is made for recording the number of copy sheets fed through the machine. For this purpose, a recorder lever 228 is swingably mounted, by means of a pivot 229, and is provided with a follower roller 230 adapted to engage the cam. An arm 231, fixed to the lever 228, is adapted to operate a control arm 232 on a counter device 233. The arm 231 and the lever 228 are biased counterclockwise by means of a spring 234.

In order to prevent operation of the counter 233 when the feed mechanism is turned off, a latching lever 236 is provided to restrain the recorder lever 228 from following its cam when the impression roller 81 is lowered to its inactive position. A shoulder 237 on the latching lever 236 is adapted to be hooked over an ear 238 on the recorder lever 228 to latch the lever 228 against counterclockwise movement.

When the feed is turned on, the latching lever 236 is swung counterclockwise, so as to release the recorder lever 228. Such movement of the latching lever 236 is effected by means of a link 240 connected between the cam plate 212 and the lever 236. At its lower end, the link 240 is pivoted to the cam plate 212. The upper end of the link 240 is formed with a lost motion slot 242 which receives a pin 243 mounted on the latching lever 236. A spring 244 extends downwardly from the pin 243 and is anchored at its lower end to the link 240. When the cam plate 212 is swung counterclockwise to raise the impression roller 81, the link 240 is shoved upwardly, and this results in counterclockwise movement of the latching lever 236 so as to release the recorder lever 228. When the feed mechanism is turned off, the cam plate 212 is swung clockwise, as described above. Accordingly, the link 240 is pulled downwardly so as to swing the latching lever 236 into the path of the ear 238. On the rising part of its cam, the ear 238 slides along a ramp 246 on the lever 236 and moves behind the shoulder 237, so that the lever 228 will be latched against return movement.

The duplicator 20 is so arranged that the feed table 70 will be raised automatically, as copy sheets are used, to maintain the top of the copy sheet stack at a substantially constant level. To this end the table 70 is mounted for vertical movement, by means of pins 250 or other guide members slidable in vertical slots 251 (Fig. 2) formed in the side plates 22 and 23, the guide pins being mounted in pairs on either side of the table.

As copy sheets are fed into the machine by the feed roller 72, the top of the supply stack drops, with the result that the roller 72 and its supporting arms 111 swing downwardly. The gear shaft 139 on the right hand arm 111 engages an arm 252 of a lever 253 (Figs. 18-21) and swings the lever clockwise against the bias of a spring 253a. The lever 253 has a depending arm 254 provided with an ear 255 which normally engages a finger 256 on a latching arm 257. A spring 258 is connected between the ear 254 and the arm 256 so as to bias the latter upwardly and tend to maintain the finger 256 against the ear 255. As the paper supply is depleted, the spring 258 tends to raise the latching arm, which eventually has the effect of raising the feed table 70, as will now be explained.

To provide for raising the feed table 70, vertical racks 260 are mounted on the guide pins 250 which support the table. The racks 260 mesh with pinions 261 secured to a shaft 262 extending between the side plates 22 and 23. A ratchet wheel 263 is also fixed to the shaft and is operable by means of a pawl 264 pivoted on an arm 265 which is freely swingable about the shaft 262. A spring 267 is connected between the arm 265 and the pawl 264 to bias the latter against the ratchet wheel 263. Another spring biased pawl 268 is utilized to prevent retrograde movement of the ratchet wheel 263.

It will be evident that clockwise movement of the arm 265 will rotate the ratchet wheel 263 and raise the racks 260 and the table 70. The arm 265 tends to be swung clockwise by a biasing spring 270. However, the arm is normally latched against such movement by the latching arm 257, a shoulder 271 being formed on the arm 257 for engagement with an ear 272 extending laterally from the arm 265.

In order to swing the arm 265 counterclockwise against the bias of the spring 270, an ear 274 is arranged to extend laterally from the arm 265 into the path of the lower end of the cam follower lever 184. On the rising portion of the cam 190, the lever 184 is swung clockwise against the ear 274, and the arm 265 is thus swung a sufficient distance to relieve the pressure between the latching shoulder 271 and the ear 272. It will be recalled that the downward movement of the feed roller 72 tends to raise the latching arm 257. As the copy sheets are fed from the supply stack, the roller 72 moves downwardly to such an extent that the arm 257 is raised clear of the ear 272 when the pressure between the ear and the shoulder 271 is relieved. When the arm 265 is thus unlatched, it is swung downwardly by the spring 270 so as to follow the lever 184 in its return movement, occurring on the falling part of the cam 190. This movement of the arm 265 advances the ratchet wheel 263 and thus raises the feed table 70. The feed roller 72 is also raised, with the result that the latching arm 257 is swung downwardly. Accordingly, the ear 272 is relatched behind the shoulder 271 when the arm 265 is swung upwardly on the next power stroke of the cam follower lever 184.

The feed table 70 may be raised manually by rotating a knob 276 (Fig. 1) mounted on the outer end of the ratchet wheel shaft 262. To lower the table 70, the operator depresses a hand lever 278 which is freely pivoted on the shaft 262. Formed on the hand lever 278 is a cam portion 280 which thereupon engages the pawls 268 and 264 so as to lift them clear of the ratchet wheel 263, ears 281 and 282 being formed on the pawls to engage the cam 280. When the hand lever 278 is released, it is returned upwardly by means of a biasing spring 283.

The duplicator is arranged so that the feed mechanism will be shut off automatically when the feed table 70 has been fully raised and the supply of copy sheets has been reduced to a few sheets. It will be recalled that the feed roller 72 moves downwardly as the copy sheets are fed from the supply stack into the machine. This causes the ratchet wheel 263 to be advanced periodically so as to raise the feed table 70 and hence to restore the feed roller 72 to its former level. After the feed table 70 has been raised fully, the ratchet wheel 263 can be advanced no farther. Accordingly, the engagement of the pawl 264 with the ratchet wheel 263 prevents the spring 270 from advancing the arm 265, even after the downward movement of the feed roller 72 has swung the latching arm 257 upwardly away from the ear 272. As a result, the feed roller 272 continues to drop as the remaining copy sheets are fed into the machine. The shaft or pin 139 on the roller supporting arm 111 swings the lever 253 downwardly until a latching shoulder 290 thereon moves below a latching ear 291 formed on a shutoff lever 292. For a purpose to be explained shortly, a pin 294 is mounted on the lever 292 for engagement by the lower end of the cam follower lever 184 at the high point of the cam 190.

After the parts 290 and 291 have been unlatched, a biasing spring 296 swings the shutoff lever 292 counterclockwise during the fall of the cam 190. As a result, a downwardly extending arm 297 on the lever 292 engages an ear 298 extending laterally from the control lever 162. At the low part of the cam 190, the spring 296 swings the control lever 162 fully clockwise with the result that the shoulder 182 on the pawl 178 is engaged with the ear 183 on the cam follower lever 184. Thus, on the rising part of the cam 190, the cam follower lever 184 rotates the cam lever 172 clockwise and thus raises the feed roller 72.

In order to move the hand lever 152 to its "off" position when automatic shutoff occurs, the cam lever 172 is provided with a shutoff cam 300 which is connected to the cam lever 172 by means of a pivot 301. The shutoff cam 300 is biased counterclockwise by means of a spring 302 connected between the cam 300 and the lever 172. An ear 303 extending laterally from the shutoff cam 300 is engageable with the lever 172 to limit counterclockwise movement of the shutoff cam. As the cam lever 172 is swung clockwise to raise the feed roller 72, in the manner just described, the shutoff cam 300 engages a pin 305 extending laterally from the link 154. This raises the link 154 and thereby lowers the hand lever 152 to its "off" position. It should be noted that the shutoff cam 300 does not interfere with the pin 305 when the cam lever 172 is swung counterclockwise to turn on the feed. Instead, the spring 302 yields to permit the shutoff cam 300 to swing clockwise relative to the cam lever 172. Accordingly, the shutoff cam 300 slides past the pin 305 without affecting the position of the link 154.

When the roller 72 is raised as a result of the automatic shutoff operation, the lever 253 swings counterclockwise. On the next high point on the cam 190, the cam follower lever 184 swings the shutoff lever 292 clockwise to such an extent that the ear 291 is relatched behind the latching shoulder 290.

If the hand lever 152 is raised in an attempt to feed the remaining copy sheets into the machine, the control lever 162 is swung counterclockwise with the result that the feed roller 72 is lowered momentarily on the next falling part of the cam 190. However, the downward movement of the roller 72 disengages the latching arm 252 from the lever 292, with the result that the lever 272 immediately swings the control lever 162 clockwise. Accordingly, the feed roller 72 is again raised on the rising part of the cam 190, before any copy sheet has been fed into the machine. At the same time, the hand lever 152 is moved downwardly to its off position by the action of the shutoff cam 300 on the link 154.

An additional control member, in the form of a hand lever 310 (Figs. 23 and 24) is provided for the purpose of feeding single sheets through the duplicator, one copy sheet being fed for each operation of the hand lever. As illustrated, the hand lever 310 compresses a control bar 311 mounted on an arm 312 of the lever. When the operator pushes the control bar 311 to the right, as seen in Figs. 23 and 24, an ear 314 on an arm 315 of the lever 310 is swung downwardly and latched beneath a shoulder 316 formed on a latching lever 317 which is swingably mounted on the pivot 163. A spring 318 biases the lever 317 counterclockwise and thus tends to maintain the latching engagement between the lever and the arm 315.

To provide for turning on the feed mechanism when the lever 310 is operated, a biasing spring 320 is connected between a pivoted arm 321 and an arm 322 formed on the lever 310. Both the lever 310 and the pivoted arm 321 are swingable about a pivot 323. An ear 324 on the pivoted arm 321 is engageable with the arm 315 on the lever 310 to limit clockwise swinging movement of the arm 321 under the biasing action of the spring 320. When the operator swings the lever 310 clockwise, the spring 320 pulls the pivoted arm 321 downwardly. An ear 326 on the arm 321 is moved against the upper edge of an arm 327 on the control lever 162. At the next high point on the cam 190, the control lever 162 is swung fully counterclockwise, which has the ultimate result of lowering the feed roller 72 in the manner already described, the roller being lowered on the next falling part of the cam 190. The movement of the control lever 162 also results in counterclockwise movement of the cam plate 212 on the next rising part of the cam 190. This has the effect of moving the impression roller 81 against the cylinder 32. With the feed roller 72 lowered and the impression roller 81 thus raised, a copy sheet is fed through the duplicator.

As the lever 162 is swung counterclockwise, it pulls the link 154 downwardly and tensions the spring 158. This movement of the link 154 takes up the lost motion provided by the slot 157 but does not affect the position of the hand lever 152. Later in the cycle the tension in the spring 158 is utilized to return the control lever 162 clockwise, as will be explained shortly.

When the hand lever 310 is moved clockwise by the operator to feed a single sheet, the automatic shutoff lever 292 is disabled by means of a bell crank lever 330 and a pair of arms 331 and 332. A spring 333 biases the lever 330 clockwise to maintain engagement between the arm 331 and a flange 334 formed on the arm 312 of the hand lever 310. When the hand lever 310 is swung clockwise, the arm 332 moves upwardly to engage an ear 336 of an arm 337 of the shutoff lever 292. If automatic shutoff has occurred prior to the operation of the hand lever 310, the arm 332 swings the lever 292 clockwise so that its arm 297 will not interfere with the operation of the control lever 162.

To limit the operation of the machine to a single cycle so that only one copy sheet will be fed, a link 340 is connected between the impression roller cam plate 212 and the latching lever 317. In order to provide for lost motion in this linkage, a pin 341 on the lever 317 is engaged with a slot 342 formed in the link 340. A pivot pin 344 is utilized to connect the other end of the link 340 to the cam plate 212. As the cam plate 212 is swung counterclockwise to raise the impression roller 81, the link 340 and the latching lever 317 are pulled to the right. This unlatches the arm 315, whereupon the action of the biasing spring 333 returns the hand lever 310 counterclockwise to its original position. The lever 310 engages the ear 324 and swings the arm 321 upwardly from the control lever 162. This permits the spring 158 to pull the link 154 upwardly and return the control lever 162 clockwise. Accordingly, the feed roller 72 is raised on the next rising part of the cam 190, before a second copy sheet can be fed.

In summarizing the operation of the duplicating machine 20, it will be assumed initially that the drive motor 40 has been turned off with the feed control lever 152 lowered so that the feed mechanism will also be in its off position. In preparation for a new run, a master sheet is installed on the master cylinder 32 by swinging the clamp operating lever 59 clockwise and rotating the hand wheel 38 backward (clockwise). When this is done, the roller 61 abuts against the pawl 60 on the arm 59, and the levers 54 are thus swung counterclockwise to move the clamping bar 52 outwardly in its slot 53. The leading edge of the master sheet is then inserted under the clamping bar and the latter is retracted by releasing the clamp operating lever 59 for return movement.

The feed table 70 may be loaded with a supply of copy sheets by depressing the hand lever 278 to lower the table 70. The lever 278 accomplishes this result by camming the pawls 264 and 268 away from the ratchet wheel 263 (Figs. 18 and 20). With the feed table 70 thus lowered, a full ream of copy sheets may be placed on the table. If less than a ream is used, the table 70 may be raised to the desired height of turning the knob 276 clockwise (Fig. 1). The leading edge of the stack of copy sheets is abutted against the stop plate 150 (Fig. 11), which at this stage is raised above the level of the table 70, because the feed roller 72 and its supporting arms 111 are in their raised, inactive positions.

The pressure to be applied between the impression roller 81 and the cylinder 32 may be set to the desired value by releasing the pawl 105 and swinging the lever 104 to the desired setting. Raising the lever 104 increases the pressure setting, and vice-versa.

To turn on the drive motor 40, the finger piece 43a is pressed down to swing the rocker 43 (Fig. 3) counterclockwise. This raises the link 44 and swings the switch operating lever 42 clockwise so as to turn on the switch 41. With the motor 40 energized, the master cylinder 32 is continuously rotated.

The feeding of copy sheets is initiated by swinging the feed control lever 152 upwardly. This pushes the link 154 (Figs. 14 and 15) downwardly so as to swing the control lever 162 counterclockwise. At the next high point on the control cam 190, the follower lever 184 pushes the pawl 178 upwardly and thus relieves the latching engagement between the ear 171 on the plate 172 and the notch 170 in the latching pawl 169. The control lever 162 thereupon swings the pawl 169 counterclockwise to permit the spring 180 to swing the cam plate 172 counterclockwise on the next falling part of the cam 190. Such movement of the cam plate 172 lowers the feed roller 72 into engagement with the top of the supply stack on the feed table 70.

Before any copy sheets are fed to the master cylinder 32, the impression roller 81 is automatically raised. In moving counterclockwise, the control lever 162 pushes on the link 200 and swings the snap lever 204 clockwise. At the low point of the cam 190, the pawl 220 is thus moved into the path of the pin 215 on the follower lever 184. On the rise of the cam 190, the follower lever 184 shoves the link 220 downwardly and swings the cam plate 212 counterclockwise. As a result, the impression roller crankshaft 100 is rotated counterclockwise whereupon the crank 99 (Fig. 26) swings the levers 87 clockwise and raises the impression roller 81. There is sufficient overtravel of the crank 99 to stress the bow spring 89 so that spring pressure will be applied to the impression roller 81.

Figure 15:
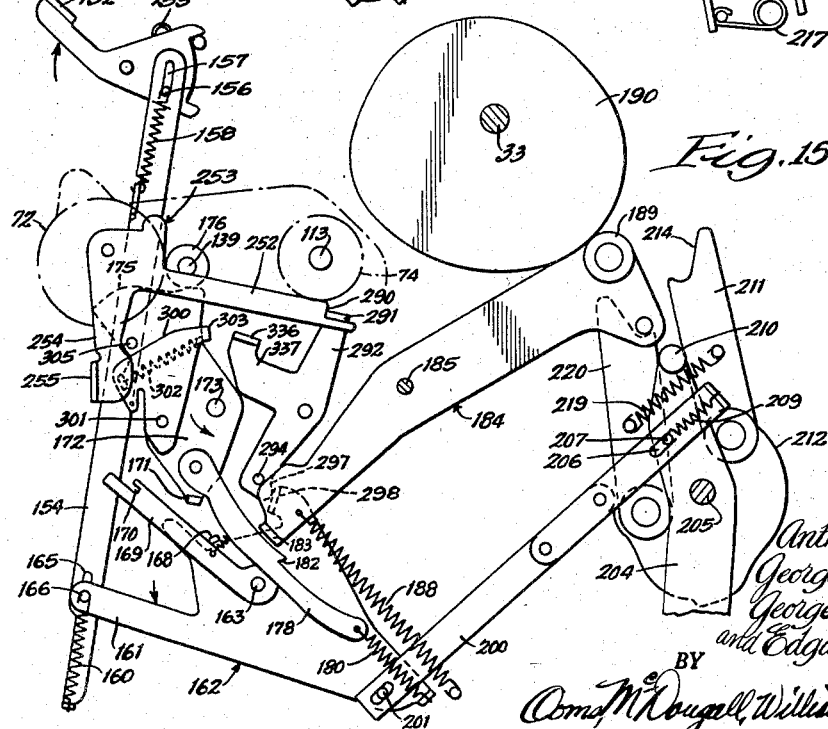
Fig. 15 is a view similar to Fig. 14 with the feed mechanism shown in its on position.

As copy sheets are fed from the supply stack into the machine, the feed table 70 is automatically raised to maintain the top of the supply stack at a substantially constant level. The feeding of the copy sheets lowers the level of the top of the stack and causes the feed roller 72 and its supporting arms 111 to drop. The pin 139 on one of the arms 111 engages the top edge of the arm 252 and swings the lever 253 clockwise (Figs. 15 and 18). This causes the spring 258 to raise the latching arm 257 and releases the actuating arm 265. On the next falling part of the cam 190, the spring 270 causes the arm 265 to follow the lever 184, with the result that the pawl 264 advances the ratchet 263 so as to raise the racks 260 connected to the feed table 70. With the table 70 thus raised, the latching arm 257 returns downwardly, with the result that the actuating arm 265 is relatched when it is returned to its raised position by the cam follower lever 184.

The feed mechanism is automatically turned off after the table 70 has been raised fully and the supply of copy sheets has been nearly exhausted. This is brought about by downward movement of the feed roller 72 below the point at which the feed table 70 normally is raised. When such downward movement of the roller 72 occurs, the pin 139 pushes the arm 252 downwardly to such an extent that the ear 291 is unlatched from the shoulder 290, whereupon the spring 296 swings the lever 292 counterclockwise (Figs. 15 and 22). The arm 297 on the lever 292 engages the ear 298 and swings the control lever 162 clockwise so as to cause the follower lever 184 to engage the pawl 178 and swing the cam lever 172 clockwise. This raises the feed roller 72 and causes the shutoff cam 300 to engage the pin 305 and raise the link 154. Accordingly, the link 154 lowers the feed control lever 152 to its off position. The raising of the roller 72 and its supporting arms 111 permits the arm 252 to return upwardly, with the result that the shutoff lever 292 is relatched when it is swung clockwise by the cam follower lever 184, the pin 294 on the lever 292 being engageable with the lower end of the lever 184.

Whether or not the automatic shutoff mechanism has operated, the copy sheets may be fed one at a time by pushing the hand control bar 311 inwardly. This swings the lever 310 clockwise, with the result that the ear 314 on this lever is latched beneath the shoulder 316 on the latching lever 317. The lever 310 swings the bell crank lever 330 counterclockwise, whereupon the arm 332 engages the ear 336 and prevents the automatic shutoff lever 292 from turning the feed off, even if the ear 291 should be unlatched by downward movement of the arm 252. When the lever 310 is swung clockwise, the spring 320 causes the arm 321 to swing the control lever 162 counterclockwise so as to lower the feed roller 72 and raise the impression roller 81. The raising of the impression roller 81 is accomplished by virtue of counterclockwise movement of the cam plate 212 in the manner already described. In moving counterclockwise, the cam plate pulls on the link 340 and swings the latching lever 317 clockwise, whereupon the lever 310 is released for return movement under the biasing action of the spring 333. The control lever 162 is returned to its off position by the spring 158. In this way, the feed mechanism is turned off after a single sheet has been fed through the machine.

It will be apparent that the duplicating machine is fully power driven and that all of the functions of the feed mechanism are carried out without any substantial effort on the part of the operator. When the feed mechanism is turned off, the forwarding rollers are separated from each other and the impression roller is separated from the cylinder, with the result that it is extremely unlikely that the rollers will be left under pressure overnight or for any extended period.

The machine is capable of duplicating an entire ream of copy sheets without constant attention from the operator. On the other hand, a few sheets may be duplicated by operating the single sheet feeding lever.

Various modifications and alternative constructions may be employed, without departing from the scope of the invention, as described above and defined in the following claims.

We claim:

1. In a duplicating machine, the combination comprising a rotatable duplicating cylinder, means for rotating said cylinder, an impression roller engageable therewith, a pair of interengageable forwarding rollers for advancing copy sheets between said cylinder and said impression roller, stack engaging feed means for separating copy sheets from a supply stack and feeding the copy sheets to the forwarding rollers, a movable hand control member, a selectively rockable feed control cam for lowering and raising said feed means into and out of engagement with the stack, means for engaging and disengaging said forwarding rollers in response to lowering and raising of said feed means, pawl means connected to said feed cam, a drive cam rotatable with said cylinder, a follower member oscillable by said drive cam, means operable by said control member for selectively shifting said pawl means into the path of said follower member to operate said feed cam, an impression roller control cam for moving said impression roller into and out of engagement with said cylinder, second pawl means connected to said impression roller cam, and means operable by said hand control member for selectively shifting said second pawl means into the path of said follower member to operate said impression roller cam.

2. In a duplicating machine, the combination comprising a rotatable master cylinder, means for rotating said cylinder, an impression roller for engaging said cylinder, means for holding a stack of copy sheets, feeding means for feeding copy sheets between said cylinder and said roller, control means movable manually between feed initiating and feed terminating positions for controlling said feeding means, a control cam rotatable by said cylinder, follower means oscillable by said control cam, biasing means, movable shutoff means operable by said biasing means for moving said control means to its feed terminating position, restraining means for holding said shutoff means against movement by said biasing means, and means operable in response to depletion of the supply stack for disabling said restraining means and thereby terminating operation of said feeding means.

3. In a duplicating machine, the combination comprising a rotatable master cylinder, means for rotating said cylinder, an impression roller for engaging said cylinder, a supply table for holding a stack of copy sheets, feeding means including vertically movable sheet separating means engageable with the top of the stack for feeding copy sheets between said cylinder and said roller, a feed cam for raising and lowering said sheet separating means, a control cam rotatable by said cylinder, follower means oscillable by said control cam, a movable control member, connecting means movable by said control member into and out of connecting relation between said follower means and said feed cam for controlling operation of said feeding means, movable shutoff means for actuating said control member, means for biasing said shutoff means into position for terminating operation of said feeding means, latching means for holding said shutoff means in an inactive position to prevent termination of the operation of said feeding means, and means operable by said sheet separating means in response to downward movement thereof caused by depletion of the supply stack for unlatching said latching means and thereby terminating operation of said feeding means.

4. In a duplicating machine, the combination comprising a rotatable master cylinder, means for rotating said cylinder, an impression roller for engaging said cylinder, means for holding a stack of copy sheets, feeding means movable into and out of engagement with the top of the stack for selectively feeding copy sheets between said cylinder and said roller, a control cam rotatable by said cylinder, follower means operable by said cam, feed control means for moving said feeding means into and out of engagement with the stack, a movable control member, a manually movable member movable between feed initiating and feed terminating positions, means effecting a lost motion connection between said manually movable member and said control member, connecting means operable by said control member for selectively effecting a connection between said follower means and said feed control means, shutoff means for actuating said control member into position for moving said feeding means out of engagement with the stack, latching means restraining operation of said shutoff means, means operable by said feeding means in response to downward movement thereof caused by depletion of the stack for releasing said latching means, and means operable by said feed control means while moving said feeding means out of engagement with the stack for moving said manually movable member to said feed terminating position.

5. In a duplicating machine, the combination comprising a printing cylinder, an impression roller movable into and out of engagement with said cylinder, means for continuously rotating said cylinder, control means movable manually between first and second positions, latching means for latching said control means in said second position, control cam means operable by said cylinder, follower means oscillable by said cam means, feeding means for feeding copy sheets between said cylinder and said roller, means operable by said follower while moving in one direction for initiating operation of said feeding means in response to movement of said control means to said second position, impression roller actuating means operable by said follower means while moving in the opposite direction for moving said impression roller into engagement with said cylinder in response to movement of said control means to said second position, and means operable by said impression roller actuating means for unlatching said latching means and thereby releasing said control means for return movement to said first position to terminate operation of said feeding means and effect movement of said impression roller away from said cylinder.

6. In a duplicating machine, the combination comprising a printing cylinder, an impression roller movable into and out of engagement with said cylinder, means for continuously rotating said cylinder, control means movable manually between feed terminating and feed initiating positions, feeding means for feeding copy sheets between said cylinder and said roller, first means operable by said cylinder in response to movement of said control means to its feed initiating position for initiating operation of said feeding means, second means operable by said cylinder in response to movement of said control means to said feed initiating position for subsequently moving said impression roller into engagement with said cylinder, and means operable by said second means for returning said control means to said feed terminating position to terminate operation of said feeding means and effect movement of said impression roller away from said cylinder.

References Cited in the file of this patent
UNITED STATES PATENTS

| | | |
|---|---|---|
| 336,070 | Sedgwick et al. | Feb. 9, 1886 |
| 1,084,295 | Rea et al. | Jan. 13, 1914 |
| 1,393,513 | Duval | Oct. 11, 1921 |
| 1,996,709 | Ritzerfeld | Apr. 2, 1935 |
| 2,083,862 | Paxton | June 15, 1937 |
| 2,220,255 | Marchev et al. | Nov. 5, 1940 |
| 2,356,315 | Gudger | Aug. 22, 1944 |
| 2,387,750 | Davidson | Oct. 30, 1945 |
| 2,442,574 | Storck | June 1, 1948 |
| 2,517,868 | Goodwin | Aug. 8, 1950 |
| 2,518,878 | Gerlach | Aug. 15, 1950 |
| 2,542,073 | Aberle | Feb. 20, 1951 |
| 2,615,393 | Albrecht | Oct. 28, 1952 |
| 2,639,666 | Halley | May 26, 1953 |
| 2,660,113 | Gullixson | Nov. 24, 1953 |